Figure 1:
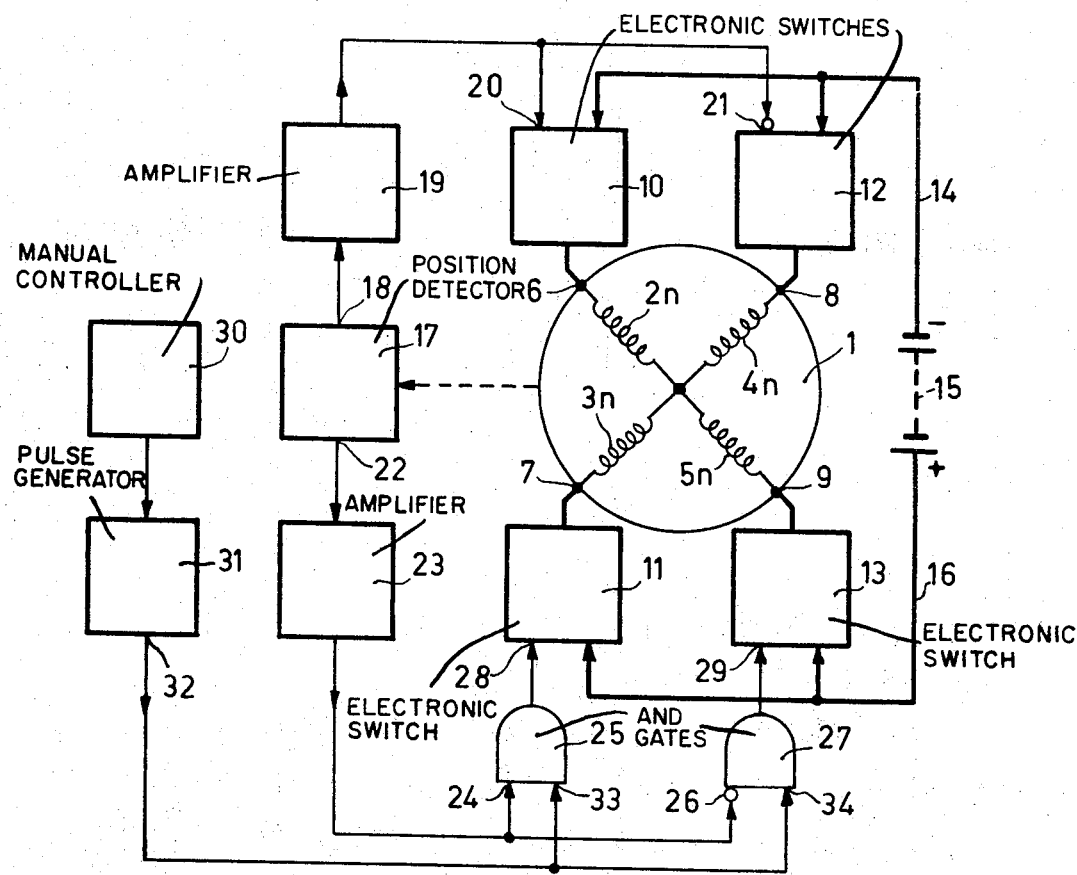

United States Patent [19]
Dolbachian et al.

[11] 3,769,555
[45] Oct. 30, 1973

[54] ELECTRONIC CONTROL DEVICE FOR USE WITH A VARIABLE RELUCTANCE MOTOR

[75] Inventors: Raymond Dolbachian, Meudon; Claude Lefevre, Saint-Maur, both of France

[73] Assignee: U.S. Philips Corporation, New York, N.Y.

[22] Filed: Feb. 4, 1972

[21] Appl. No.: 223,635

[30] Foreign Application Priority Data
Feb. 5, 1971  France .............................. 7103937

[52] U.S. Cl. ................. 318/138, 318/171, 318/254
[51] Int. Cl. ......................................... H02k 29/00
[58] Field of Search .................. 318/138, 166, 171, 318/254, 685, 696

[56] References Cited
UNITED STATES PATENTS
3,359,474   12/1967   Welch et al. ................... 318/254 X
3,117,268   1/1964    Madsen ........................... 318/171 X
3,127,548   3/1964    Vanemden .......................... 318/696
3,214,663   10/1965   Krevtzer ............................ 318/138
3,324,369   6/1967    Markakis ............................ 318/138
3,461,367   8/1969    Takeyasu et al. ................. 318/254 X Primary Examiner—Gene Z. Rubinson
Attorney—Frank R. Trifari

[57]  ABSTRACT

A control device for an electric motor with a stator having at least four groups of coils. Four switches are connected to the four coil groups so that two switches connect one terminal of a DC voltage supply to two coil groups and the other two switches connect the other terminal of the DC supply to the other two coil groups. A rotor position detector operates the first two switches in mutually exclusive time intervals at a frequency related to the rotor rotation. A pulse generator and two AND gates operate the other two switches in mutually exclusive time intervals at the frequency of the pulse generator. The frequency and the width of the pulse generator output pulses are variable.

11 Claims, 10 Drawing Figures

3,769,555

ELECTRONIC CONTROL DEVICE FOR USE WITH A VARIABLE RELUCTANCE MOTOR

The invention relates to an electronic control device for an electric motor provided with a stator having at least four groups of coils, a rotor having at least four poles made of a hard-magnetic or a soft-magnetic material, and a detector having two outputs and detecting the relative positions of the stator and of the rotor, which device includes a manual controller which cooperates with a pulse generator, at least four electronic switches and at least two AND gates.

The invention relates particularly but not exclusively to the control of a variable-reluctance motor provided with two stator circles which each comprise a plurality of wound poles of trapezoidal section and between which a toothed rotor made of a soft-magnetic material is adapted to move, the length of each of the said teeth being equal to twice the pole pitch, while the number of teeth is equal to one quarter of the number of poles of each stator circle.

Motors of this type are used in particular for electrically driven vehicles in which driving, braking, steering, and so on are solely effected by electronically controlling two motors which each are directly secured to the hub of one of the rear-wheels of a three-wheeled platform, the required energy being provided by a battery.

In motors of this type the rotation movement is obtained by the cyclic switching of the stator coil groups under the control of a position detector which detects the positions of the rotor teeth relative to the poles.

In a known embodiment switching of the stator coil groups of each motor is effected by means of four power thyristors which are cyclically caused to fire in pairs, the time interval during which current flows through the two thyristors determining the mean current flowing through the stator coils and thus the power available at the motor shaft.

Thyristors are unsuitable for controlling large currents at comparatively low voltages. In this case the voltage drop between the anode and the cathode of a thyristor forms a significant part of the available voltage of the voltage supply source. This disadvantage is increased when a variable-reluctance motor is to be controlled, since at any time two thyristors are fired in series in the circuit comprising the supply source and the coils. This results in a decrease in the efficiency at full load and in the production of an appreciable amount of heat so that effective cooling means are required.

Moreover, the firing of the thyristors is controlled by means of pulses of large amplitude and short duration which are supplied by blocking oscillators. Hence in the known arrangement each of the four thyristors is provided with a firing circuit which comprises, among other circuit elements, a choke coil and a transformer.

Finally, it is known that the flow of direct current in a thyristor can be interrupted only by switching off the supply voltage or by short-time inversion of the voltage between the anode and the cathode. Hence the known arrangement requires two extinction circuits which each comprise, among other circuit elements, a capacitor, two transformers and a thyristor.

The foregoing shows that the use of thyristors not only reduces the efficiency but also requires additional circuits which are comparatively complicated and include bulky and expensive elements.

It is an object of the invention to provide a variable-reluctance motor in which the cyclic switching of the coils is directly effected by means of the amplified output signals of the position detector.

Another object of the system is to control the mean current flowing through the coils so that the losses due to the Joule effect are reduced to a minimum in the active and passive elements of the control circuits.

According to the invention an electronic control device for a variable reluctance electric motor, which comprises at least a manual controller which cooperates with a pulse generator, four electronic switches and two AND gates, is characterized in that two coil groups are each connected to an output of an electronic switch, the switches each having a first input terminal connected to a terminal of a direct voltage supply source and a second input terminal. The two second input terminals are inverted with respect to one another and are connected through a common amplifier to a first output of the position detector. The remaining two coil groups also are each connected to an output of an electronic switch which has a first input which is connected to the other terminal of the direct voltage supply source and a second input, the second inputs each being connected to the output of an AND gate. The first inputs of the two AND gates are inverted with respect to one another and being connected through a common amplifier to the second output of the position detector, the second inputs of the gates being connected to the output of the pulse generator.

Thus two of the four switches operate at the frequency of the signals delivered by the position detector, while the remaining two switches are switched in a variable cycle within the period of these signals via the pulse generator under the control of the manual controller.

The use of germanium alloy transistors in conjunction with particular control circuits reduces the Joule-effect losses to a minimum, permitting the radius of action of the vehicle in which the device is used to be as large as is possible in view of the power stored in the battery.

Figure 2:
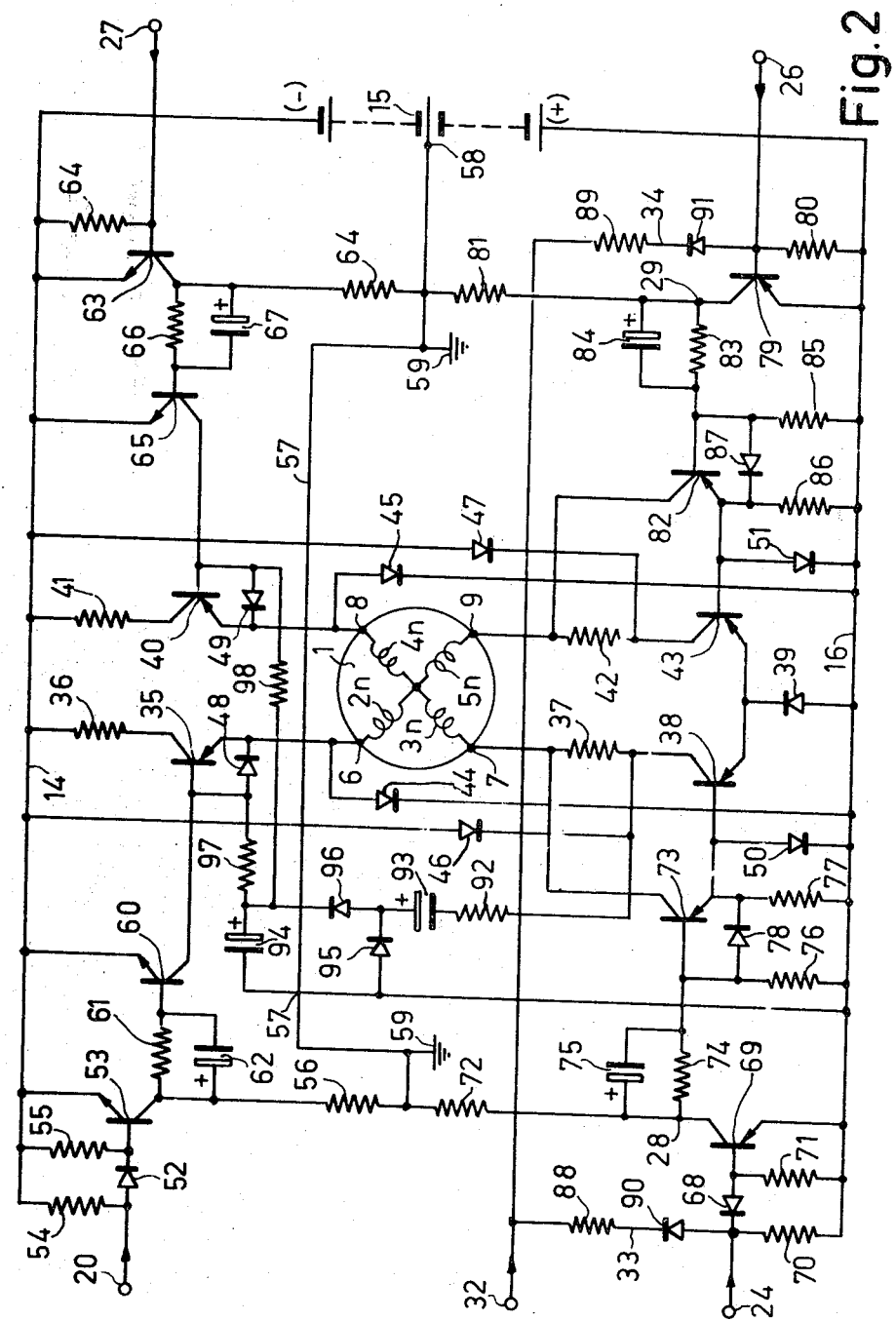
Figure 3:
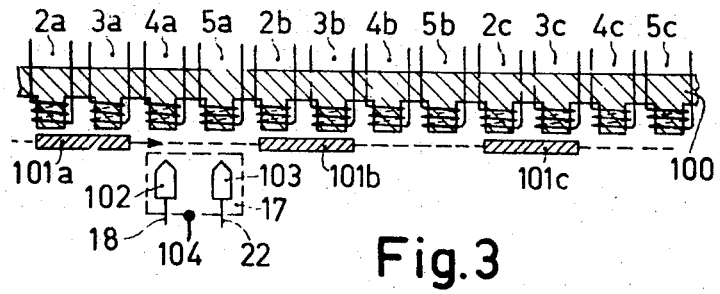
Figure 4:
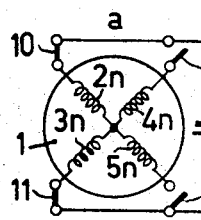
Figure 5:
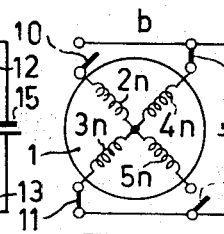
Figure 6:
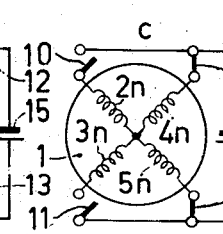
Figure 7:
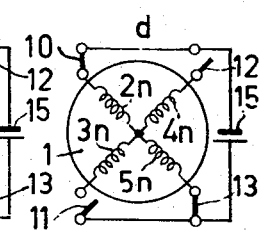
Figure 8:
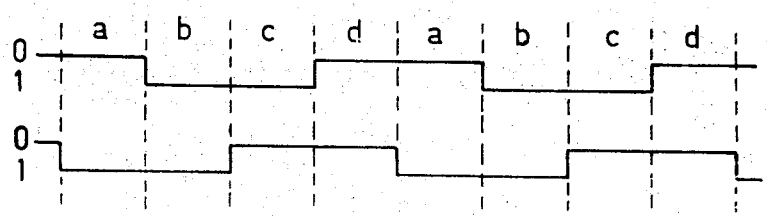
Figure 9:
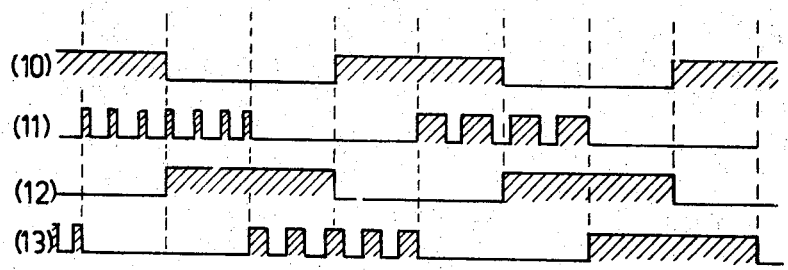
Figure 10:

An embodiment of a device according to the invention will now be described, by way of example, with reference to the accompanying diagrammatic drawings, in which:

FIG. 1 is a block diagram of the device according to the invention,

FIG. 2 is a circuit diagram showing schematically the basic elements of this device, FIG. 3 shows part of the stator and rotor elements of the motor and the position detector, FIGS. 4, 5, 6 and 7 respectively show the four stages of the connections of the coil groups of the motor, FIG. 8 shows the waveforms of the signals delivered by the position detector, FIG. 9 shows the make-and-break sequences of each of the electronic switches at constant speed and increasing load of the motor, and FIG. 10 shows the waveform of the current supplied by the battery during the stages shown in FIG. 9.

Referring now to FIG. 1, four terminals 6, 7, 8 and 9 of an electric motor 1 are respectively connected to the output terminals of four electronic switches 10, 11, 12 and 13. The motor 1 has four groups 2n, 3n, 4n and 5n of coils arranged in star connection.

The interconnected input terminals of the electronic switches 10 and 12 are connected by a conductor 14 to the negative terminal of a battery 15, while the interconnected input terminals of the switches 11 and 13 are connected by a conductor 16 to the positive terminal of this battery.

One of the outputs 18 of a detector 17, which detects the position of the stator relative to that of the rotor of the motor, is connected to the input of an amplifier 19. The output of the amplifier 19 is connected to the second input 20 of the switch 10 and also to the second input 21 of the switch 12 at which the inverted signal appears.

A second output 22 of the position detector 17 is connected to. The input of an amplifier 23 the output of amplifier 23 is connected to a first input 24 of an AND gate 25 and also to a first input terminal 26 of an AND gate 27, at which terminal the inverted signal appears. The outputs of the AND gates 25 and 27 are connected to the second inputs 28 and 29 of the switches 11 and 13, respectively.

The output of a manual controller 30 is connected to the input of a pulse generator 31 which delivers pulses the width and the repetition frequency of which are variable.

The output 32 of the pulse generator 31 is connected to interconnected second inputs 33 and 34 of the AND gates 25 and 27.

In FIG. 2, in which like elements are designated by the same reference numerals as are used in FIG. 1, the terminal 6 of the motor 1 is connected to the emitter of a pnp switching transistor 35, the collector of which is connected through a resistor 36 to the negative supply line 14 connected to the negative terminal of the battery 15.

The terminal 7 of the motor 1 is connected through a resistor 37 to the collector of a pnp switching transistor 38, the emitter of which is connected to. The cathode of an isolation diode 39 the anode of diode 39 is connected to the positive supply line 16 which is connected to the positive terminal of the battery 15.

The terminal 8 of the motor 1 is connected to the emitter of a pnp switching transistor 40, the collector of which is connected to the negative supply line 14 through a resistor 41.

The terminal 9 of the motor is connected through a resistor 42 to the collector of a pnp switching transistor 43, the emitter of which is connected to the cathode of the diode 39.

The terminals 6 and 8 of the motor are respectively connected to the anodes of two protective diodes 44 and 45, the cathodes of which are connected to the positive supply line 16. The cathodes of two other protective diodes 46 and 47 are respectively connected to the collectors of the transistors 38 and 43, the anodes of these diodes 46 and 47 being connected to the negative supply line 14. Two further protective diodes 48 and 49 are respectively connected between the emitter and the base electrodes of the transistors 35 and 40, the anodes of these diodes being connected to the bases.

The bases of the transistors 38 and 43 are respectively connected to the anodes of two protective diodes 50 and 51, the cathodes of which are connected to the positive supply line 16.

The second input 20 is connected to the anode of a threshold diode 52, the cathode of which is connected to the base of an npn amplifier transistor 53. The emitter of transistor 53 is connected to the negative supply line. The anode and cathode of the diode 52 are connected to the negative supply line 14 through a resistor 54 and a resistor 55, respectively. The collector of the transistor 53 is supplied through a resistor 56 from a voltage line 57 which is connected to a centre tapping 58 on a battery 15 and forms the ground 59 of the arrangement.

The collector of the transistor 53 is connected to the base of a npn transistor 60 via the parallel combination of a resistor 61 and an electrolytic capacitor 62. The emitter of the transistor 60, which together with the transistor 35 forms a Darlington configuration, is directly connected to the negative supply line 14, while its collector is connected to the base of the transistor 35.

The second input 21, to which a signal is applied which is inverted with respect to the signal applied to the second input 20, is connected to the base of an npn amplifier transistor 63, which base is also connected to the negative supply line 14 via a resistor 64. The collector of the transistor 63 is connected to the ground 59 via a resistor 64 a.

The collector of the transistor 63 is connected to the base of an npn transistor 65 via the parallel combination of a resistor 66 and an electrolytic capacitor 67.

The emitter of the transistor 65, which together with the transistor 40 forms a Darlington connection, is directly connected to the negative supply line 14, while its collector is connected to the base of the transistor 40.

The first input 24 of the AND gate 25 is connected to the cathode of a threshold diode 68, the anode of which is connected to the base of a pnp amplifier transistor 69. The emitter of transistor 69 is connected to the positive supply line 16. The cathode and the anode of the diode 68 are connected to the positive supply line 16 through a resistor 70 and a resistor 71, respectively. The collector of the transistor 69 is connected to ground at 59 via a resistor 72.

The collector of the transistor 69, which forms the output terminal 28 of the AND gate 25 (FIG. 1) is connected to the base of a pnp transistor 73 via the parallel combination of resistor 74 and an electrolytic capacitor 75. The base of the transistor 73, which together with the transistor 38 forms a Darlington connection, is connected via a resistor 76 to the positive supply line 16, to which its emitter also is connected via a resistor 77. An isolation diode 78 is connected between the base and the emitter of the transistor 73, the diode cathode being connected to the emitter. The emitter of the transistor 73 is further directly connected to the base of the transistor 38 and its collector is connected to the terminal 7 of the motor 1.

The second input 26 of the AND gate 27, to which a signal is applied which is inverted with respect to the signal applied to the second input 24, is connected to the base of a pnp amplifier transistor 79, which base is also connected to the positive supply line 16 via a resistor 80. The collector of the transistor 79 is connected via a resistor 81 to ground at 59.

The collector of the transistor 79, which forms the output 29 of the AND gate 27 (FIG. 1), is connected to the base of a pnp transistor 82 via the parallel combination of a resistor 83 and an electrolytic capacitor 84. The base and the emitter of the transistor 82, which together with the transistor 43 forms a Darlington connection, are connected to the positive supply line 16 through resistors 85 and 86, respectively, an isolation diode 87 being connected between the base and the emitter of the transistor 82 with the cathode of the diode connected to the emitter. This emitter is also directly connected to the base of the transistor 43, while the collector of the transistor 82 is connected to the terminal 9 of the motor 1.

The output 32 of the pulse generator 31 (FIG. 1) is connected through resistors 88 and 89 to the cathodes of diodes 90 and 91, respectively, which each form the second input 33 and 34, respectively, of the two AND gates 25 and 27, respectively (FIG. 1). The anodes of these diodes are connected to the first inputs 24 and 26, respectively, of the said AND gates.

A voltage doubling circuit connected between the collector of the transistor 38 and the positive supply line 16 comprises a resistor 92, two electrolytic capacitors 93 and 94 and two diodes 95 and 96.

The resistor 92 is connected between the collector of the transistor 38 and the negative terminal of the capacitor 93, the positive terminal of which is connected to the cathode of the diode 95 and also to the anode of the diode 96.

The negative terminal of the capacitor 94 and the anode of the diode 95 are connected to the positive supply line 16, while the positive terminal of the capacitor 94 and the cathode of the diode 96, which cathode is the output of the voltage doubling circuit, are connected to the bases of the transistors 35 and 40 through resistors 97 and 98, respectively.

FIG. 3, in which corresponding elements are designated by the same reference numerals as are used in FIGS. 1 and 2, shows part of the stator of the motor 1, the coils of which are wound on poles which form parts of a magnetic circuit 100. Coil parts 2a, 2b, 2c and so on, 3a, 3b, 3c and so on, 4a, 4b, 4c and so on, 5a, 5b, 5c and so on are interconnected either in series or in parallel so as to form the four coil groups 2n, 3n, 4n and 5n.

The rotor has teeth 101a, 101b, 101c, . . . , 101n which are made of a material which is either soft-magnetic or hard-magnetic and which are integral with a shaft, not shown.

The active outputs 18 and 22 of the position detector 17 correspond to two transducers 102 and 103 arranged near the rotor and the stator, a passive output 104 being connected to ground at 59.

For simplicity, only part of a stator circle is shown. In actual fact there are two such circles, one on either side of the rotor teeth. Obviously the poles associated with the coil parts of any one group are aligned.

The operation of the device according to the invention may be explained as follows:

In FIG. 1 the heavy lines show the power circuit and the thin lines the control circuit proper. The coil groups 2n, 3n, 4n, 5n are fed through the switches 10, 11, 12 and 13 in a cycle which comprises four stages a, b, c and d shown in FIGS. 4, 5, 6 and 7, respectively.

As will be seen from the Figures, in each stage only two of the switches connected to the terminals of the battery 15 are closed. Thus current is supplied to the coil groups 2n and 3n during the stage a (FIG. 4), to the groups 3n and 4n during the stage b (FIG. 5), to the groups 4n and 5n during the stage c (FIG. 6) and to the groups 2n and 5n during the stage d (FIG. 7).

The sequence of the stages is determined by logic signals (FIG. 8) supplied by the transducers 102 and 103 of the position detector 17 (FIG. 3).

It should be noted that the position detector 17 is designed so as to be capable of delivering the logic signals when the rotor is stationary. In this case the manual controller is in the position "standstill," which prevents operation of the pulse generator 31. When the motor comes to a standstill during the stage a, for example, the switch 10 is closed and the switch 12, to the second input of which the inverted signal is applied, is open.

On the other hand the switches 11 and 13 are open owing to the fact that the AND gates 25 and 27, to the inputs 33 and 34 respectively of which no signals are applied, are blocked.

When the manual controller 30 is set to the position "slow" the generator 31 delivers short pulses during which the gate 25 is open. At this instant the coil groups 2n and 3n are traversed by a pulsatory current (11 in FIG. 9) and the motor starts. The fact that the poles 101a, 101b, . . . pass the transducers 102 and 103 then will cause changes in the levels of the logic output signals of these transducers, with the result that the switch 10 is opened and the switch 12 is closed, the switch 11 remaining closed during the presence of the pulses (stage b).

During the stage c the switch 11 is opened and the switch 13 is closed during the presence of the pulses (13 in FIG. 9), after which the cycle is repeated.

FIG. 9 shows diagrammatically the operation in the case of constant speed and increase of the load imposed on the motor (for example, when climbing a gradient). As will be seen from the Figure, under these conditions the duration of the pulses delivered by the generator 31 increases progressively, until it becomes equal to that of the square-wave signal from the position detector. Then the motor operates on full power.

FIG. 10, the time scale of which is equal to that used in FIGS. 8 and 9, shows that the current drawn from the supply source 15 then has the form of a sequence of square waves the width of which increases up to the instant at which the motor operates on full power, whereupon the current is no longer pulsatory but continuous.

In a manner known but not shown in the drawing, starting of the motor 1 in either sense of rotation is effected by simultaneous inversion of the signals applied to the input terminals 20 and 21 of the electronic switches 10 and 12, respectively, and of the signals applied to the input terminals 28 and 29 of the electronic switches 11 and 13, respectively.

For simplicity, in the drawings the switch 12 and the gate 27 have been provided with inputs which invert the applied signals. In actual fact inversion is effected by inverters connected between these inputs and the respective outputs of the amplifiers 19 and 23.

In FIG. 2 the switch 10 of FIG. 1 comprises the transistors 35 and 60 in Darlington connection preceded by the amplifier transistor 53, while the switch 12 comprises the transistors 40 and 65 preceded by the transistor 63.

Similarly the switch 11 comprises the transistors 38 and 73 preceded by the transistor 69, and the switch 13 comprises the transistors 43 and 82 preceded by the transistor 79.

The threshold diodes 52 and 68 connected between the input 20 and the base of the transistor 53 and between the input 24 and the base of the transistor 69, respectively, form the elements which provide connection to the outputs of the amplifiers 19 and 23 (FIG. 1).

As has been mentioned with reference to the block diagram shown in FIG. 1, the terminals 21 and 26 have logic signals applied to them which are inverted with respect to the signals at terminals 20 and 24, respectively, by means of two inverters, not shown.

Small-value resistors 36, 37, 41 and 42 are provided to ensure operation of the transistors 35, 38, 40 and 43 respectively in the saturation region by increasing the emitter potentials of the transistors 35 and 40 and by also increasing the collector potentials of the transistors 73 and 82 relative to the collector potentials of the transistors 38 and 43, respectively.

The electrolytic capacitors 62, 75, 67 and 84 enable the transistors 60, 73, 65 and 82 to be rapidly cut off at the instant at which the transistors 53, 69, 63 and 79, respectively are switched.

The transistors 38 and 43 are cut off in a conventional manner by a common emitter diode 39, whereas when the motor is running the transistors 35 and 40 are cut off by means of a voltage doubling circuit. This solution is preferable to the provision of a blocking diode in the emitter circuit of each of the transistors 35 and 40, for, having regard to the required powers, the use of a voltage-doubling circuit is much more economical and its power consumption is substantially negligible in spite of the large number of its components. The switching voltage derived between the collector of the transistor 38 and the positive supply line 16 is applied to a voltage-doubling circuit of the Schenkel type, the output voltage of which is set up at the positive terminal of the capacitor 94 and is applied to the bases of the transistors 35 and 40. The cut-off currents are limited by the resistors 97 and 98 to values which are appreciably smaller than the control currents of the transistors when conducting, while ensuring that when the transistors are not conducting they remain effectively cut off.

When the motor is at standstill the transistors 38 and 43 are cut off, but to the base of one of the transistors 35 and 40 there is applied a signal which tends to render it conductive, since the transducer 17 still applies a logic signal to the inputs 20 and 21. Under these conditions and assuming, for example, the transistor 35 to be conducting, the circuit is closed through the coil groups 2n and 4n, the diode 49, the resistor 98 and the diodes 96 and 95. This quiescent current, which is limited to a small value by the resistor 98, exerts no perceptible torque on the rotary poles.

The diodes 78 and 87 transmit the positive cut-off pulse to the bases of the transistors 38 and 43, respectively, while the diodes 44, 46, 45 and 47 protect the transistors 35, 38, 40 and 43, respectively, against switching surges of inductive origin at the terminals of the coil groups of the motor.

When the manual controller 30 is abruptly changed over from forward to reverse the surge voltages at the terminals of the coils change polarity as long as the motor continues rotating in the same sense. As a result the collector voltages of the transistors 38 and 43 become positive with respect to their emitter voltages. Because these transistors are germanium alloy transistors, and hence are capable of tolerating reverse conduction, protection is simply provided by the diodes 50 and 51 through which the bases are supplied from the positive supply line 16 during reverse conduction.

In the same manner the diodes 48 and 49 permit the operation of the transistors 35 and 40, respectively, during reverse conduction, while they also limit the inverse voltage applied between the bases and emitters of these transistors.

To halve the power dissipated in the resistors 56, 72, 64a and 81 through which current is supplied to the bases of the transistors 60, 73, 65 and 82, respectively, the resistors are connected to a centre tapping 58 on the battery 15, this terminal forming the ground 59 with respect to which all the signals applied to the inputs of the device are defined.

For simplicity the current-limiting circuit provided in the device according to the invention is not shown. This circuit utilizes the voltage drop across the resistors 36 and 41 of the collector paths of the transistors 35 and 40, respectively, and enables the currents flowing in each group of coils of the motor 1 to be controlled.

Such a current limiting circuit is described in our French Pat. No. 1,378,235 filed Oct. 3, 1963 and in our U.S. Pat. of addition Ser. No. 182,084 filed Dec. 30, 1968, under the title "Improvements in supply circuits for electric direct-current systems."

It should be noted that although the control circuit according to the invention has been developed for use with a variable-reluctance motor having rotor poles made of a soft-magnetic material, it may similarly be used in conjunction with a synchronous motor the rotor poles of which are permanent magnets, provided that this motor is equipped with a detector of the relative positions of the rotor and the stator.

What is claimed is:

1. An electronic control device for an electric motor provided with a stator having at least four groups of coils and a rotor having at least four poles made of a magnetic material and comprising, a position detector having two outputs and arranged to detect the position of the rotor relative to the stator, a manual controller which cooperates with a pulse generator, a source of direct voltage for energizing said groups of coils, at least four electronic switches and at least two AND gates, two coil groups each being connected to an output of an electronic switch, the switches having first inputs connected to one terminal of said direct-voltage supply source and second inputs which are mutually inverted and are connected through a common amplifier to a first output of the position detector, the remaining two coil groups each being connected to an output of an electronic switch, the latter switches having first inputs which are connected to the other terminal of the direct-voltage supply source and second inputs which each are connected to the output of a respective one of said AND gates, the AND gates having first inputs which are mutually inverted with respect to one another and are connected through a second common amplifier to a second output of the position detector, and means connecting the second inputs of the AND gates to the output of the pulse generator.

2. An electronic control device as claimed in claim 1, wherein the electronic switches each comprise at least two transistors connected in a Darlington configuration.

3. An electronic control device as claimed in claim 1 wherein the switches comprise power transistors, and a voltage-doubling circuit connected between one of the terminals of the direct-current supply source and one of the output electrodes of one of the power transistors.

4. An electronic control device as claimed in claim 3 further comprising two resistors, and means connecting the output of the voltage-doubling circuit to the control electrodes of two of the power transistors via said two resistors.

5. An electronic control device as claimed in claim 2, characterized in that the bases of the switching transistors of the Darlington configuration are each connected via a resistor to a centre tapping on the direct-current supply source.

6. A motor control circuit for a motor having four groups of stator coils and a rotor comprising, a source of DC supply voltage for the stator coils, means for detecting the rotor position to derive first and second out of phase control signals, four switching devices each with an output individually connected to an associated stator coil group, means connecting a first input terminal of each of a first pair of said switching devices to one terminal of the DC supply and a first input terminal of each of the second pair of switching devices to the other terminal of the DC supply, means responsive to said first control signal for switching said first pair of switching devices in mutually exclusive time intervals and at the frequency of said first control signal, a pulse generator, and means for combining the output pulses of the pulse generator with said second control signal to derive switching signals that switch the second pair of switching devices in mutually exclusive time intervals and at the frequency of the generator output pulses.

7. A control circuit as claimed in claim 6 further comprising means for varying the width and the frequency of the generator output pulses.

8. A control circuit as claimed in claim 6 wherein said combining means comprise first and second And gates each having first and second input terminals and an output terminal individually connected to a second input terminal of the second pair of switching devices, means connecting a first input terminal of said first and second gates to the output of the pulse generator, and means for applying the second control signal to a second input of a first one of said And gates and an inverted replica of the second control signal to the second input of the second one of said And gates.

9. A control circuit as claimed in claim 6 further comprising means for varying the width and the frequency of the generator output pulses as a function of the motor load.

10. A control circuit as claimed in claim 6 further comprising a voltage doubler circuit connected between one terminal of the DC supply and an output of one of said switching devices.

11. A control circuit as claimed in claim 6 wherein rotation of the rotor causes the detecting means to derive first and second square wave control signals that are 90° out of phase with one another.

* * * * *